United States Patent [19]

Baker

[11] Patent Number: 4,548,916

[45] Date of Patent: Oct. 22, 1985

[54] CATALYST PRODUCTION AND USE

[75] Inventor: Maurice G. Baker, Cleveland, England

[73] Assignee: Imperial Chemical Industries, PLC, London, England

[21] Appl. No.: 573,344

[22] Filed: Jan. 24, 1984

[30] Foreign Application Priority Data

Feb. 2, 1983 [GB] United Kingdom ............... 8302885

[51] Int. Cl.[4] ........................... C08F 4/62; C08F 4/64; C08F 4/68
[52] U.S. Cl. .................................. 502/105; 502/104; 502/127; 502/129; 502/132; 502/133; 502/134; 526/124; 526/155
[58] Field of Search ............... 502/133, 132, 129, 134, 502/105, 127, 104

[56] References Cited

U.S. PATENT DOCUMENTS

| | | | |
|---|---|---|---|
| 3,135,809 | 6/1964 | Bosmajian | 502/114 X |
| 3,549,717 | 12/1970 | Itakura et al. | 502/127 X |
| 4,104,243 | 8/1978 | Howard | 502/133 X |
| 4,424,138 | 1/1984 | Candlin et al. | 502/162 |
| 4,460,700 | 7/1984 | Candlin et al. | 502/104 |
| 4,465,783 | 8/1984 | McKenzie | 502/105 |

FOREIGN PATENT DOCUMENTS

| | | |
|---|---|---|
| 72128 | 2/1983 | European Pat. Off. . |
| 980007 | 1/1965 | United Kingdom . |
| 1162079 | 8/1969 | United Kingdom . |
| 2103630 | 2/1983 | United Kingdom . |
| 207880 | 3/1968 | U.S.S.R. . |

OTHER PUBLICATIONS

Japanese Patent Gazette, week K07, 11th Jan. 1983, Polymer Chemistry, p. 7 & JP -A- 58 001 707.
Chemical Abstracts, vol. 69, No. 4, 22nd Jul. 1968, p. 1052, 10920p, Columbus, Ohio, USA & SU -A-207 880.

*Primary Examiner*—Patrick P. Garvin
*Attorney, Agent, or Firm*—Cushman, Darby & Cushman

[57] ABSTRACT

A catalyst component for olefin polymerization is a mixture of a transition metal composition with finely divided talc or a metal salt of an aromatic carboxylic acid. The talc or metal salt can be mixed with the transition metal composition during the production thereof or in a subsequent stage. Preferably an intimate mixture of the transition metal composition and the talc or metal salt is obtained, for example by grinding or by spraydrying. The catalyst component may be used to prepare an olefin polymer having improved properties.

13 Claims, 2 Drawing Figures

CATALYST PRODUCTION AND USE

The present invention relates to a catalyst component for an olefin polymerisation catalyst, the production of the catalyst component, a polymerisation catalyst including said catalyst component, an olefin polymerisation process using the catalyst and an olefin polymer obtainable by the olefin polymerisation process.

Polymerization catalysts for the polymerisation of olefin monomers, particularly the higher olefin monomers such as propylene, can be obtained by mixing together a compound of a transition metal of Group IVA to VIA of the Periodic Table and an organic compound of aluminium or a metal of Group IA or IIA of the Periodic Table. An interaction occurs on mixing to give a species which is capable of polymerising an olefin monomer. Such catalyst systems are frequently referred to as "Ziegler" catalysts and developments in Ziegler catalysts have resulted in catalysts which have high polymerisation activity and which are capable of producing polymers of high crystallinity, as determined by the solubility of the polymer in boiling heptane. In an attempt to improve the properties of the polymers, it has been proposed, for example in British Patent Specification No. 980 007, to incorporate a salt of a carboxylic acid into the polymer.

According to the present invention there is provided a solid material which is a mixture of (a) a solid composition containing at least one transition metal of Groups IVA, VA or VIA of the Periodic Table and (b) finely divided talc and/or a salt of aluminium or of a metal of Group IA or IIA of the Periodic Table and a carboxylic acid containing an aromatic group wherein components (a) and (b) are present in the solid material in the relative proportions by weight of from 20:1 to 1:10.

All references herein to the Periodic Table are to the Short Periodic Table as set out inside the back cover of "General and Inorganic Chemistry" by J. R. Partington, Second Edition, published by McMillan and Company Limited, London, 1954.

Hereafter, a transition metal of Groups IVA, VA or VIA of the Periodic Table will be referred to simply as the "transition metal". Preferably the transition metal is titanium. The solid composition may be a solid compound of a transition metal such as titanium trichloride, which may additionally include compounds of other metals, for example aluminium halides such as aluminium chloride or alkyl aluminium chlorides, as a consequence of the procedure used to obtain the solid transition metal compound. Hereafter, the term "titanium trichloride" is used to include titanium trichloride materials which also contain compounds of other metals. Alternatively, component (a) is a solid composition comprising a transition metal compound and a solid support material, for example titanium tetrachloride on silica, alumina or, preferably, magnesium chloride. In the preparation of such alternative materials, the transition metal compound, and/or the solid support material, may be treated with other reagents such as compounds which are Lewis Bases (hereafter "Lewis Base compounds"), halogen-containing compounds or organic metallic compounds.

Component (b) may be finely divided talc by which is meant talc having a particle size which is such that at least 90% by weight of the talc has a particle size of less than 10 microns, preferably less than 5 microns. A particularly useful talc is one wherein 50% by weight of the talc has a particle size of two microns or less.

The salt of aluminium or of a metal of Group IA or IIA of the Periodic Table and a carboxylic acid containing an aromatic group will hereafter be referred to simply as the "organic metal salt". The organic metal salt which may be used as component (b) is typically a sodium salt. The carboxylic acid containing an aromatic group may be benzoic acid or a substituted benzoic acid such as 4-tertiarybutylbenzoic acid. Examples of the organic metal salt include sodium benzoate, sodium 4-tertiary-butylbenzoate, aluminium benzoate and aluminium 4-tertiary-butylbenzoate.

The relative proportions of components (a) and (b) in the solid material will be dependent on the activity of the catalyst system obtained from the solid material and also on the type, and degree of dispersion, of component (b). Typically, the solid material contains components (a) and (b) in the relative proportions by weight of from 2:1 to 1:4.

We prefer that the solid material is an intimate mixture, by which is meant a mixture in which particles of components (a) and (b) are agglomerated together to give discrete particles, most of which are an agglomeration of sub-particles of both components (a) and (b).

More specifically, the solid material is formed of discrete particles, at least 90% by weight of said discrete particles being an agglomeration of sub-particles of (a) a solid composition containing at least one transition metal and (b) finely divided talc and/or a salt of aluminium or of a metal of Group IA or IIA of the Periodic Table and a carboxylic acid containing an aromatic group wherein components (a) and (b) are present in the solid material in the relative proportions by weight of from 20:1 to 1:10.

The particles forming the solid material typically have a particle size which is such that essentially all, that is at least 90% by weight, of the particles of the solid material are in the range from 5 up to 100 microns, particularly between 10 and 80 microns, for example having a mean size, by weight, of about 30 microns, this being particularly so when the particles of the solid material are an agglomeration of components (a) and (b). When the particles are an agglomeration, most of the particles are an agglomeration of smaller sub-particles and typically these sub-particles have a mean size, by weight, of less than 10 microns, preferably less than 5 microns and especially less than 2 microns.

The particles forming the solid material preferably have a regular shape and, in particular, are essentially spherical agglomerated particles.

The preferred solid material is a mixture, and especially is agglomerated particles, containing titanium trichloride and talc.

Thus, as a preferred embodiment of the present invention there is provided a solid material which is formed of discrete particles, at least 90% by weight of said discrete particles being sub-particles of (a) titanium trichloride and (b) finely divided talc, the titanium trichloride and talc being present in the relative proportions by weight of from 20:1 to 1:10.

The solid material of the present invention is a mixture of components (a) and (b) and may be produced by any suitable mixing technique.

Thus, according to a further aspect of the present invention there is provided a process wherein (a) a solid composition containing a transition metal of Groups IVA, VA or VIA of the Periodic Table is mixed with (b) finely divided talc and/or a salt of aluminium or of a metal of Group IA or IIA of the Periodic Table and a carboxylic acid containing an aromatic group, and (a) and (b) are mixed in the relative proportions by weight of from 20:1 to 1:10.

The solid material can be used as a component of an olefin polymerisation catalyst and mixing together of components (a) and (b) can be effected in a polymerisation reactor, optionally in the presence of an organic metallic compound of the type which is used as a further component of the catalyst system.

Commercially available talc may contain a small proportion, typically not more than 1% by weight of the talc, of absorbed water. Since such water can have a harmful effect on the catalytic properties of compounds of transition metals when used for olefin polymerisation, before such talc is mixed with the solid composition containing at least one transition metal, it is desirable to treat the talc with a reagent which reacts with at least the major proportion of any water which is absorbed by the talc. Reagents which may be used for this purpose include halogen-containing compounds such as thionyl chloride, but it is preferred to use an organic metallic compound of the type which is used, or which can be used, as a further component of the polymerisation catalyst. The proportion of the reagent used is typically at least 0.3 millimole for each gramme of talc.

The solid composition which is component (a) of the solid material may be a commercially available material which is used without any further treatment. Alternatively, the solid composition which is component (a) may be subjected to one or more treatment stages to make it suitable for use as a component of an olefin polymerisation catalyst, and conveniently component (b) is added during one of these treatment stages.

Thus, according to a preferred embodiment of the further aspect of the present invention, there is provided a process wherein at least one compound of a transition metal is subjected to at least one treatment stage to obtain a solid composition containing the at least one transition metal wherein finely divided talc and/or an organic metal salt is added during at least one of said treatment stages.

The treatment stage may be one in which a solid compound of a transition metal is ground with a Lewis Base compound and such a treatment stage may be modified by effecting the grinding in the additional presence of finely divided talc and/or an organic metal salt. The talc and/or the organic metal salt may be added to the solid compound of a transition metal at any stage during the grinding. It is preferred to grind the solid compound of a transition metal for a period of time, for example one to 40 hours, with either the Lewis Base compound or the additional component which is finely divided talc and/or the organic metal salt and then to add the other material to the ground mixture and continue grinding for a further period of time, which may be the same as, or different from, that used for the initial stage of grinding. The grinding conditions, that is the temperature, time and grinding intensity, which are used are within the knowledge of the skilled worker. Thus, the temperature may be from $-50°$ C. up to $100°$ C. and may be varied during the course of the grinding. The total time of grinding is selected to give a catalyst system having the desired characteristics, particularly activity, and is typically from 10 up to 50 hours. The grinding intensity is dependent on the type of grinding apparatus, for example a rotating ball mill or a vibration ball mill, and a shorter grinding time is usually required when using an increased grinding intensity such as results from the use of a vibration ball mill.

If component (a) is a supported compound of a transition metal, several treatment stages may be required to effect the preparation of this component, and component (b) may be added during any one or more of these treatment stages. If the treatment stages include one in which grinding is effected, component (b) may be added during the grinding stage, the grinding conditions conveniently being as hereinbefore described.

If component (a) is obtained by a process in which a solid material is formed by a precipitation process, for example by reacting titanium tetrachloride with a reducing compound such as an alkyl aluminium compound, component (b) may be present during the precipitation stage. The product of such a precipitation process may be used with no further treatment but in general it will be preferred to subject the product to a heat treatment stage, for example at a temperature of at least $60°$ C. Since the liquid medium may contain undesirable reaction products, the solid product may be separated from the liquid reaction medium, if desired washed once or several times, and finally resuspended in a further quantity of a liquid medium.

A number of the processes of preparing component (a) include a grinding step. Using a grinding step, the product obtained may have a broad particle size distribution and/or contain particles of irregular shape and the use of catalyst systems based on such ground products is not entirely satisfactory. Improved particle form may be achieved by spray drying a suspension containing a compound of a transition metal, for example as disclosed in published European patent application No. 37182. Alternatively, a suspension of a support material may be spray dried and thereafter contacted, preferably in the absence of grinding, with a transition metal compound, for example as described in published European patent application No. 72129. Prior to effecting the spray drying, the suspension may be subjected to mechanical action to cause a reduction in the particle size of the solid material, for example as described in published European patent application No. 72128, and such a process will be referred to hereafter as "pulverising". If a spray drying step is used in the production of component (a), an intimate mixture of components (a) and (b) may be obtained by adding component (b) to the suspension to be spray dried and then spray-drying either a suspension containing both components (a) and (b); or a suspension containing a support material for a compound of a transition metal and component (b).

According to a preferred aspect of the present invention, a suspension is formed which contains a compound of a transition metal or a solid support material for a compound of a transition metal, optionally the suspension is subjected to mechanical action to cause a reduction in the particle size of the solid material, finely divided talc and/or an organic metal salt is added to the suspension before or after subjecting the suspension to the optional mechanical action, the suspension containing the compound of a transition metal or a solid support material for a compound of a transition metal together with finely divided talc and/or the organic metal salt is spray dried and a spray-dried solid is collected.

Hereafter, the solid support material for a compound of a transition metal will be referred to simply as the "support material".

The suspension typically contains finely divided talc, either titanium trichloride or titanium tetrachloride on a support material, which is preferably magnesium chloride, and a liquid hydrocarbon, halocarbon or halohydrocarbon medium. Preferably, the suspension also contains a material such as polystyrene or polymethylmethacrylate, which renders the spray-dried solid more resistant to attrition and which may also assist in the agglomeration of the solid particles during the spray drying step. The spray-dried solid may be subjected to further treatments and such further treatments are very desirably effected without grinding. However, it is generally preferred that the spray-dried material is not subjected to any further treatment prior to being used as a component of an olefin polymerisation catalyst.

When the spray-dried solid is a mixture of a support material together with finely divided talc and/or an organic metal salt, a further treatment stage will be required in which the spray-dried solid is treated with a compound of a transition metal. This treatment is preferably effected by suspending the spray-dried solid in a liquid medium which is, or which contains, a compound of a transition metal.

The suspension which is spray-dried contains at least one solid material together with a liquid medium. The liquid medium which is present in the suspension is preferably one which does not have a harmful effect on the spray-dried, solid material which contains, or which is subsequently contacted with, a compound of a transition metal, when this spray-dried solid material is used as a polymerisation catalyst component.

It is generally preferred that the liquid medium is an inert liquid, particularly a hydrocarbon or inert halohydrocarbon. This is particularly preferred if component (a) is present in the suspension or if contacting with a compound of a transition metal is effected after the optional pulverising step and before the spray-drying step. The liquid medium is preferably an aliphatic hydrocarbon such as hexane, heptane, octane, decane, dodecane or mixtures thereof, or an aromatic hydrocarbon such as benzene, toluene or xylene or a halohydrocarbon such as chlorobenzene or 1,2-dichloroethane.

As is described in more detail in published European patent application No. 72128, a pulverising stage may be effected before spray-drying. Pulverising of the suspension can be effected using any technique wherein mechanical action causes a reduction in the particle size of at least one of the solid materials present in the suspension. The suspension which is pulverised may contain either only component (a), or only the support material or only component (b) and thereafter the other component may be added to the pulverised suspension. However, it is generally preferred that the suspension which is pulverised contains component (b) and also either component (a) or the support material.

If a pulverising step followed by a spray-drying step is effected, the suspension which is subjected to these steps also may be subjected to an intermediate treatment stage, for example by contacting with a compound of a transition metal, between the pulverising and spray-drying steps. However, we prefer that the pulverising and spray-drying steps are effected in succession with no intervening treatment stages.

One pulverising process which may be used is to grind the suspension. If the solid material, or one of the solid materials, present in the suspension has been subjected to a previous grinding stage, the suspension may be ground in the same grinding apparatus by the addition of a desired quantity of the liquid medium, and optionally a further solid material such as finely divided talc or an organic metal salt, to the grinding apparatus and then continuing to grind for the desired period of time. Alternatively, pulverising may be effected by grinding the suspension using a bead mill. Grinding the suspension for times of from 5 minutes up to 10 hours usually gives a suspension which can be spray-dried satisfactorily.

An alternative pulverising process which may be used is to subject a suspension simultaneously to vigorous agitation and to a shearing action. This treatment is conveniently effected using an agitation device which is capable of rapid rotation and which includes means for producing a shearing action. The combined vigorous agitation and shearing action may be achieved using devices which are suitable for emulsifying an oil in a liquid which is immiscible therewith. Suitable devices include stirrers of the Ultra Turrax type (available from Janke and Kunkel KG IKA Werke) or high shear mixers (for example available from Silverson Machines Limited of Chesham, Buckinghamshire, England).

The simultaneous vigorous agitation and shearing is effected for a time which is dependent on the device used, and is typically from 10 seconds up to 5 hours. Using an Ultra Turrax stirrer a time of from 10 seconds up to 1 hour is usually sufficient whereas, using a Silverson high shear mixer, times of from one up to two hours are generally necessary.

When a pulverising stage is effected before spray-drying, the relative proportions of the solid material, or solid materials, and the liquid medium are preferably such that, at the end of the pulverising stage, the mixture is a mobile suspension of solid material in the liquid medium. Pulverising by simultaneous vigorous agitation and shearing produces heat and may give rise to a dispersion having a high viscosity. Thus, particularly if a simultaneous vigorous agitation and shearing procedure is used, it is preferred to use the liquid medium in the proportions to give a suspension having a solid content of not more than 50% by weight of the total suspension. It is particularly preferred that the solid content of the suspension is not more than 35% by weight of the total suspension. However, it is preferred that the suspension contains at least 5%, and especially at least 15%, by weight of the solid.

The spray-drying step can be carried out using a process as described in European Patent Application Publication No. 0 037 182.

BRIEF DESCRIPTION OF THE DRAWINGS

Apparatus which may be used in the spray-drying step of the present invention is illustrated in the accompanying drawings wherein.

Figure 1:
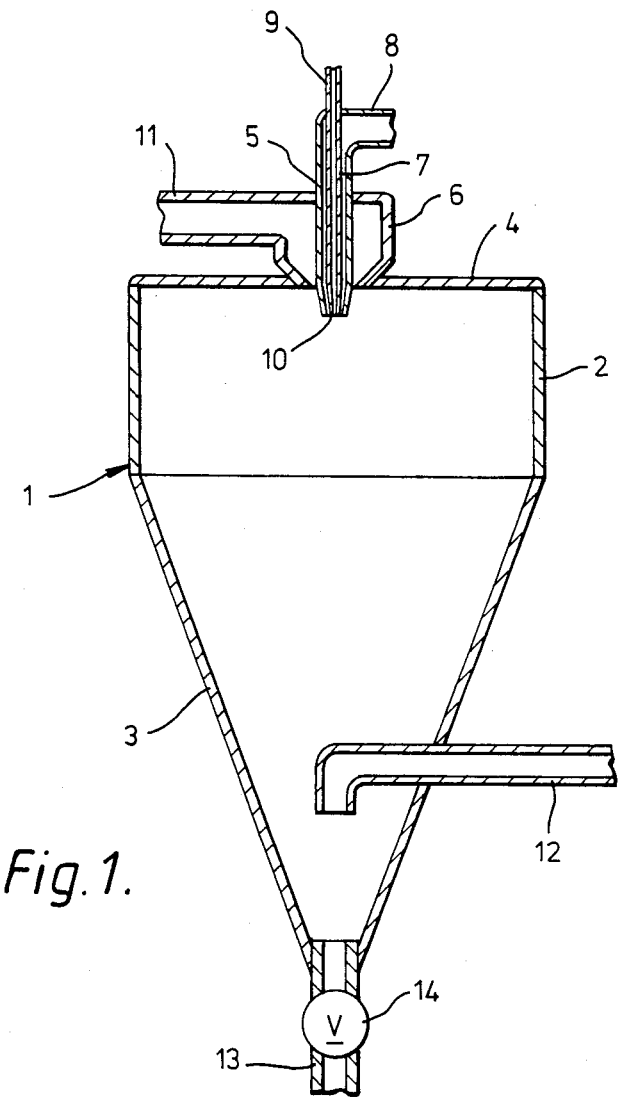
FIG. 1 there is given a cross-sectional elevation of a spray-drying apparatus having an atomising nozzle.

Spray-drying can be effected using conventional spray-drying techniques, for example by using a suitable atomizer which creates a spray or dispersion of droplets of the suspension. Suitable atomizers include nozzle atomizers and spinning disc atomizers.

Transition metal components of olefin polymerisation catalysts are often sensitive to oxidation and hence, the spray-drying stage is preferably effected in an essentially oxygen- and water vapour-free medium. A suitable gaseous medium for effecting the spray-drying is nitrogen having a high degree of purity, but any other gaseous medium may be used, particularly one which will have no deleterious effect on the transition metal compound. Thus, alternative gaseous materials which may be used include hydrogen and the inert gases such as argon or helium.

To prevent the ingress of oxygen-containing materials into the spray-drying apparatus, it is preferred to operate at a slightly elevated pressure, for example at about 1.2 kg/cm$^2$ absolute. Although the temperature within the spray-drying apparatus may be below the boiling temperature of the liquid medium under the operating pressure conditions, the temperature should be such as to cause sufficient evaporation of the liquid medium to dry at least the outer surface of the droplets before they reach the wall, or discharge point, of the spray-drying apparatus.

Preferably, the temperature at which the spray-drying is effected is relatively low since high temperatures can have a deleterious effect on those characteristics of the spray-dried solid material which are of importance for a component of an olefin polymerisation catalyst. Hence, it is preferred to introduce into the spray-drying apparatus, a hot gas at a temperature which does not exceed about 200° C. Desirably, the temperature of the droplets, or the spray-dried material, does not exceed 150° C., and preferably the maximum temperature of the droplets, or the spray-dried material, is in the range between 80° C. and 130° C. The temperature of the hot gas is at least equal to the maximum temperature attained by the droplets or spray-dried material.

Gas may be passed into the spray-drying apparatus in a counter-current flow to the droplets of the suspension but typically a cocurrent flow of the gas and the suspension is used. Using a cocurrent flow, the atomizer is typically located at the top of the spray-drying apparatus and hot gas is introduced into the top of the apparatus and is removed from near the bottom of the apparatus.

The spray-dried solid may be collected and recovered in any suitable known manner. The gas is generally removed from the spray-drying apparatus separately from the solid. Any solid entrained in the gas may be recovered by passing the gas through a cyclone. The solid recovered in the cyclone may be added to that recovered from the spray-drying apparatus. The liquid medium is removed as vapour with the gas and can be condensed in a suitable condenser. The condensed liquid medium can be re-used, possibly after a purification step.

The conditions of spray-drying can be adjusted to give any desired particle size and it is preferred that essentially all, that is at least 90% by weight, of the particles of the final spray-dried material are in the range from 5 up to 100 microns, particularly between 10 and 80 microns, for example having a mean size of about 30 microns.

The process of the present invention in which finely divided talc and/or an organic metal salt is mixed with a compound of a transition metal, may be used as one or more additional stages in catalyst preparations disclosed in the prior art, for example, in British Patent Specification Nos. 1 421 943, 1 485 181, 1 512 730, 1 527 736 and 1 559 194.

If the solid material of the present invention is a spray-dried solid, since, in use, the spray-dried solid may be subjected to shearing forces which can cause at least some break-down of the spray-dried solid to smaller particles, it is desirable to minimise such break-down. Hence, as noted previously herein, it is preferred to incorporate into the spray-dried solid a material which renders the spray-dried solid more resistant to attrition and which may also assist in the agglomeration of the solid particles during the spray-drying step (hereafter referred to as an "attrition inhibitor").

The attrition inhibitor typically is present as a solution in the liquid medium component of the suspension. The attrition inhibitor should be such that, or should be used in an amount such that, it does not have an appreciable adverse effect on the activity and stereospecificity of an olefin polymerisation catalyst system which includes such a spray-dried solid material. The attrition inhibitor is preferably soluble in the liquid medium used for the spray-drying step but is insoluble, or of low solubility, in any liquid medium in which the solid is suspended after effecting the spray-drying step.

Attrition inhibitors include, for example, polystyrene, polymethylmethacrylate, polyvinylacetate, atactic polypropylene, or an AB block copolymer for example of t-butylstyrene-styrene, but it will be appreciated that not all attrition inhibitors will be equally effective. The amount of the attrition inhibitor is preferably from 0.5% up to 10%, and especially up to 4%, by weight relative to the solid material present in the suspension.

The solid material of the present invention, which is a composition containing a transition metal and finely divided talc and/or an organic metal salt, may be used together with an organic compound of a non-transition metal to give a polymerisation catalyst system.

Thus, as a further aspect of the present invention there is provided a polymerisation catalyst which is the product obtained by mixing together (1) a transition metal composition which is the solid material of the present invention or the product obtained by the process which is a further aspect of the present invention; and (2) an organic compound of aluminium or of a metal of group IIA of the Periodic Table or a complex of an organic compound of a metal of Group IA or Group IIA of the Periodic Table together with an organic compound of aluminium.

The transition metal composition which is Component 1 of the catalyst system may be a simple mixture of (a) a solid composition containing at least one transition metal and (b) finely divided talc and/or an organic metal salt or may be an agglomerated material such as can be obtained by spray-drying a suspension containing components (a) and (b).

Component 2 of the catalyst may be an organic compound of magnesium such as, for example, a dihydrocarbyl magnesium compound, a hydrocarbyl magnesium halide compound, or an alkoxy magnesium compound preferably one containing an alkyl group in addition to an alkoxy group. Alternatively, a complex of a magnesium compound with an aluminium compound may be used, for example, a complex of a magnesium alkyl with an aluminium alkyl.

Component 2 may be a complex of a metal of Group IA with an organic compound of aluminium, for example, a compound of the type lithium aluminium tetraalkyl.

Preferably Component 2 is an organic compound of aluminium which may be, for example, an aluminium hydrocarbyl sulphate, or an aluminium hydrocarbyl hydrocarbyloxy or, more preferably, an aluminium hydrocarbyl halide, such as a dihydrocarbyl aluminium halide, or an aluminium trihydrocarbyl compound. The especially preferred aluminium compounds are dialkyl aluminium halides and aluminium trialkyls particularly those in which the alkyl group contains from 2 up to 10 carbon atoms, for example, diethyl aluminium chloride, aluminium triethyl and aluminium tri-isobutyl.

The catalyst system may consist of only two components. However, if Component 2 of the catalyst system is an aluminium trihydrocarbyl compound, and the catalyst system is to be used to polymerise a higher olefin monomer such as propylene, it is preferred that the catalyst system also includes a Lewis Base compound. Such a Lewis Base compound is additional to any Lewis Base compound which is present in component (a) of the solid material which is Component 1 of the catalyst system. Preferred Lewis Base compounds for use as a further component of the catalyst system are esters and organic silicon compounds, such as the esters of carboxylic acids which contain an aromatic group, for example, ethyl benzoate, butyl benzoate, methyl p-methylbenzoate, ethyl p-methoxybenzoate, and ethyl phenylacetate and also dialkyl phthalates and phenyl alkoxysilanes.

The catalyst system may also include further components in addition to, or instead of, the Lewis Base compound, for example a substituted or unsubstituted polyene, particularly a cyclic polyene.

The proportions of Components 1 and 2 of the catalyst system can be varied within a wide range as is well known to the skilled worker. The particular preferred proportions will be dependent on the type of materials used and the absolute concentrations of the components but, in general, we prefer that for each gramme atom of the transition metal which is present in Component 1 of the catalyst system there is present at least one mole of Component 2. The number of moles of Component 2 for each gramme atom of the transition metal in Component 1 may be as high as 1000 but conveniently does not exceed 500 and with some transition metal compositions may be not more than 25, for example, from 2 up to 10.

When the catalyst system includes a Lewis Base compound as a further component of the catalyst system, it is preferred that this Lewis Base compound is present in an amount of not more than 1 mole for each mole of Component 2 and particularly in an amount of from 0.1 up to 0.5 moles of the Lewis Base compound for each mole of Component 2. However, depending on the particular compound which is used as Component 2, and also on the Lewis Base compound, the proportion of the Lewis Base compound may need to be varied in order to achieve the optimum catalyst system.

Catalyst systems in accordance with the present invention are suitable for the polymerisation and copolymerisation of unsaturated monomers, particularly ethylenically unsaturated hydrocarbon monomers such as the olefin monomers.

Thus, as a further aspect of the present invention, there is provided a process for the production of a polymer or copolymer of an unsaturated monomer wherein at least one ethylenically unsaturated hydrocarbon monomer is contacted under polymerisation conditions with a polymerisation catalyst as hereinbefore defined.

The monomer which may be contacted with the catalyst system is conveniently one having the following formula:

$$CH_2=CHR^1$$

wherein $R^1$ is a hydrogen atom or a hydrocarbon radical.

Thus, the monomer may be ethylene, propylene, butene-1, pentene-1, hexene-1, 4-methylpentene-1, styrene, 1,3-butadiene or any other monomer which satisfies the foregoing formula. The monomer is preferably an olefin monomer, particularly an aliphatic mono-olefin monomer containing not more than 10 carbon atoms.

The monomers may be homopolymerised or may be copolymerised together. If propylene is copolymerised it is preferred to effect the copolymerisation with ethylene, conveniently using a sequential copolymerisation process as is described in British Pat. Nos. 970 478 and 970 479.

Component (1) of the catalyst may be preformed and then mixed with the other component, or components, of the catalyst in the presence, or absence, of the olefin monomer. However, as disclosed previously herein, the solid material which is Component (1) of the catalyst system may be obtained by mixing together components (a) and (b) of the solid material in the polymerisation reactor. This mixing is preferably effected in the presence of the compound which is Component (2) of the catalyst system and may also be effected in the presence of an olefin monomer. If component (b) is finely divided talc, this is preferably pre-treated with at least some of the compound which is Component (2) of the catalyst system before it is mixed with component (a). The proportion of Component (2) used in such pretreatment preferably should be sufficient to minimise the effect of any water which is absorbed on the talc and is typically at least 0.3 millimole for each gramme of talc.

If the catalyst includes a Lewis Base compound, it is preferred to premix at least some of the compound which is Component (2) with the Lewis Base compound and then to mix this pre-mixture with the solid material which is component (1).

Ziegler-Natta type catalysts are susceptible to the presence of impurities in the polymerisation system and hence it is desirable to effect the polymerisation using a monomer, and a diluent if this is being used, which has a high degree of purity. Thus, it is preferred to use a monomer which contains less than 5 ppm by weight of water and less than 1 ppm by weight of oxygen.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

Polymerisation may be effected either in a batch manner or on a continuous basis, and the catalyst components may be introduced into the polymerisation vessel separately or all the catalyst components may be mixed together before being introduced into the polymerisation reactor. If the polymerisation is being carried out in the gas phase, the catalyst components may be added to the polymerisation reactor suspended in a stream of the gaseous monomer or monomer mixture.

The polymerisation can be effected in the presence of a chain transfer agent such as hydrogen in order to control the molecular weight of the product formed. If hydrogen is used as the chain transfer agent in the polymerisation of propylene, it is conveniently used in an amount of from 0.01 up to 5.0%, particularly from 0.05 up to 2.0% molar relative to the monomer. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° C. up to 85° C.

Polymerisation can be effected at any pressure which has been previously proposed for effecting the polymerisation of monomers such as olefin monomers. However, although ethylene polymerisation may be effected at pressures up to 3000 kg/cm$^2$, at which pressures the polymerisation temperature may be 300° C. or even higher, it is preferred to carry out the polymerisation at relatively low pressures and temperatures. Thus it is preferred that the polymerisation is effected at a pressure of from 1 kg/cm$^2$ up to 50 kg/cm$^2$, preferably from 5 up to 30 kg/cm$^2$.

Figure 2:
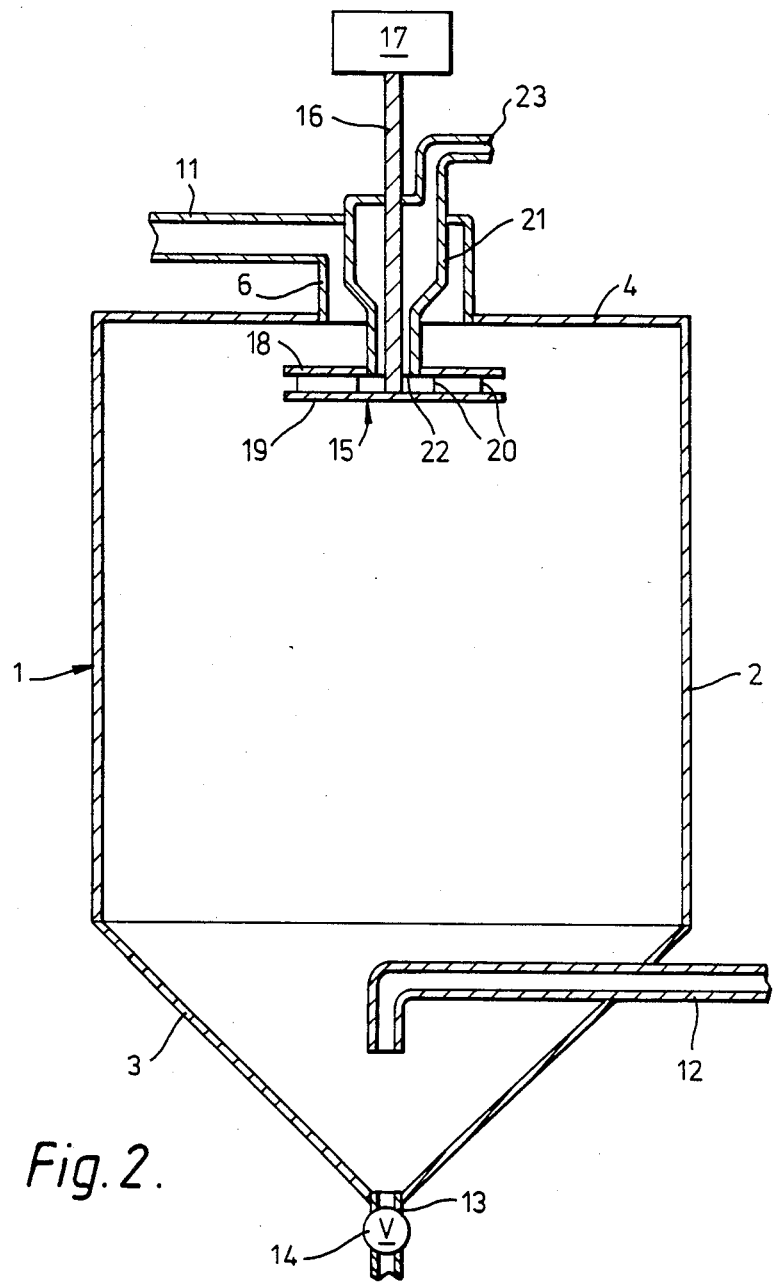
FIG. 2 there is given a cross-sectional elevation of an alternative spray-drying apparatus having a spinning disc atomizer.

Spray drying may be used as a stage in the preparation of an agglomerate of components (a) and (b) and such spray drying is conveniently effected in the apparatus illustrated in FIGS. 1 and 2 of the accompanying drawings.

Referring to FIG. 1 of the accompanying drawings, a gas-tight spray-drying vessel 1 comprises an upper cylindrical section 2 and a lower, generally conical section 3. The upper section 2 is provided with a cover plate 4.

An atomizer nozzle assembly 5 is located within a plenum chamber 6, the plenum chamber 6 being mounted on the cover plate 4. The atomizer nozzle assembly 5 contains an inner conduit 7 and an outer conduit 8. The conduit 7 is a continuation of a conduit 9, which is connected to a source (not shown) of a suspension, for example containing titanium trichloride and talc in a liquid hydrocarbon. Conduit 8 is connected to a source (not shown) of an inert gas. The conduits 7 and 8 are essentially co-axial and are tapered at their lower ends. The nozzle assembly 5 is provided at its lower end with an orifice 10 formed by openings in both of conduits 7 and 8. A conduit 11 is connected to the plenum chamber 6 and also to a source (not shown) of a heated inert gas.

Near the bottom of the vessel 1 is located a conduit 12 which passes out of the vessel 1 through the side of the conical section 3. A conduit 13, in which is located a valve means 14, is connected to the bottom of the conical section 3 and is also connected to a hopper (not shown) for storing dry solid.

In operation, the gas flow through the conduit 8 draws the suspension through the conduits 9 and 7. The gas and the suspension pass through the orifice 10 and form a spray of droplets. Hot inert gas which passes through conduit 11 and plenum chamber 6 flows past the orifice 10 and causes evaporation of the liquid medium from the droplets of the suspension. The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passed through the conduit 11 is conveniently nitrogen at a temperature in the range 130° to 150° C.

The apparatus shown in FIG. 2 is essentially the same as that shown in FIG. 1 with the exception that the atomizer nozzle is replaced by a disc atomizer. In FIG. 2, the corresponding parts are indicated by the same reference numbers as in FIG. 1.

A disc atomizer 15 mounted on the end of an output shaft 16 of a high speed gear box/motor assembly 17 is located near the top of the vessel 1. The disc 15 consists of two plates 18 and 19 between which are secured a series of radial vanes 20. A chamber 21 surrounds the drive shaft 16 and extends to the upper plate 18 of the disc 15. The plate 18 is provided with a central opening indicated at 22.

The plenum chamber 6 surrounds the chamber 21. A conduit 23 is connected to the chamber 21 and also to a source (not shown) of a suspension containing a solid material.

In operation, the disc 15 is rotated at a high speed in the range from 500 up to 25,000 rpm. A suspension which is a pulverised mixture of a solid material and an inert liquid medium, for example containing titanium trichloride and talc in a liquid hydrocarbon is passed through the conduit 23 and chamber 21 into the space between the plates 18 and 19 of the disc 15. The high speed of rotation of the disc 15, and the vanes 20, causes the suspension to pass to the periphery of the disc 15 from which the suspension is flung off as a spray of droplets.

A hot inert gas is passed through the conduit 11, and plenum chamber 6 to flow round the rotating disc 15. The hot inert gas causes evaporation of the liquid medium from the droplets of the suspension.

The inert gas containing the vaporised liquid medium and some entrained spray-dried solid, passes out of the vessel 1 through the conduit 12. The major portion of the spray-dried solid collects at the bottom of the conical section 3 from which it is withdrawn through the conduit 13 by operation of the valve means 14.

The inert gas passing through the conduit 12 may be passed to a cyclone (not shown) to recover entrained solid, then to a condenser (not shown) to recover the liquid vapour and finally to a re-heater (not shown). The reheated inert gas is then recirculated to the conduit 11. The spray-dried solid passing through the conduit 13 is passed to a storage hopper (not shown).

It will be appreciated that other alternative arrangements, and spray-drying techniques, may be used if a spray-drying stage is incorporated in the process of the present invention.

Various aspects of the present invention will now be described with reference to the following Examples which are illustrative of the invention. In the Examples, all operations are effected under an atmosphere of nitrogen unless otherwise indicated. All the glass apparatus was dried in an air oven at 120° C. for at least one hour and purged with nitrogen.

Titanium trichloride and talc were subjected to various pre-treatment stages before being mixed. These pre-treatments are set out as stages (A) to (J) hereafter.

(A) Milling titanium trichloride and n-butyl benzoate

A Siebtechnik SM 10 Vibromill having a total volume of about 38 dm$^3$ and containing 119 kg of steel balls of 25 mm diameter was sealed and purged thoroughly with nitrogen to give a nitrogen atmosphere in the mill. 2.5 kilogrammes of a titanium trichloride material (Stauffer TiCl$_3$-AA having the approximate composition TiCl$_3.\frac{1}{3}$AlCl$_3$) were introduced into the mill which was cooled for 18 hours by passing a mixture of water and ethylene glycol at about $-25°$ C. through the jacket of the mill.

After 18 hours of cooling, the mill was vibrated and the addition of n-butyl benzoate was started. Vibration of the mill was effected using a frequency of 1500 oscillations per minute and an amplitude of 2 mm about the mean, whilst passing the mixture of water and ethylene glycol at $-5°$ C. through the jacket of the mill.

560 cm$^3$ of n-butyl benzoate were added to the vibrating mill over a period of one hour, during which time there was a temperature rise. Once the addition of the n-butyl benzoate had been completed, milling was continued for a further 20 hours, with intermittent cooling to maintain the temperature at about 50° C. The milling was stopped. The stationary mill was cooled for 18 hours using the mixture of water and ethylene glycol at $-25°$ C. The contents of the mill were then milled for a further 10 minutes whilst still cooling, and finally removed from the mill. The molar ratio of titanium trichloride to n-butyl benzoate in the mill was 4 to 1.

(B) Washing with toluene 2943 grammes of the product of stage (A) were placed in a 20 dm$^3$ vessel having a heating jacket and fitted with a stirrer. 16 dm$^3$ of toluene were added, the mixture was stirred and heated up to 50° C. Stirring at 50° C. was continued for one hour and then stirring and heating were stopped and the solid was allowed to settle. The supernatant toluene was removed using a siphon. Fresh toluene was then added to give the original volume. The mixture was stirred for 15 minutes without heating, stirring was stopped and the solid allowed to settle. The supernatant toluene was siphoned off. Fresh toluene was added to give a mixture containing about 30% by weight of solid relative to the weight of the mixture.

To the mixture containing 30% by weight of solid was added a 10% weight/volume solution of polystyrene ("Styron" 686/7—available from Dow Chemical Company) in toluene in an amount to provide about 2% by weight of polystyrene relative to the solid.

(C) Dispersion of milled titanium trichloride/n-butyl benzoate

A one dm$^3$ three-necked glass flask having a heating-/cooling jacket, was fitted with a high shear homogeniser of the Ultra Turrax T45 type (available from Janke and Kunkel KG IKA Werke). Into the flask were introduced about 500 cm$^3$ of the mixture obtained in stage (B). Water at ambient temperature was passed through the heating/cooling jacket. The mixture was then subjected simultaneously to vigorous agitation and shearing by operating the homogeniser for three minutes at maximum power (an initial rate of stirring of 10,000 rpm). During the agitation and shearing, the temperature of the mixture rose.

The dispersion was then transferred to a storage vessel which was a 5 dm$^3$ three-necked glass flask fitted with a stirrer.

The foregoing procedure was repeated until all of the product of stage (B) had been dispersed. The dispersed products were combined in the storage vessel and when this was full, a similar 5 dm$^3$ glass flask was used as an additional storage vessel.

(D) Spray-drying of titanium trichloride/n-butyl benzoate

A sample (840 cm$^3$) of the combined product of stage (C) was removed and the remaining portion was spray-dried in the manner set out hereafter.

The remaining portion was spray-dried using a glass laboratory scale spray-drying apparatus similar to that described herein with reference to FIG. 1 of the accompanying drawings. The spray-drying apparatus had a diameter of 18 cm, a length of 0.7 meters and a generally hemispherical bottom section. A conduit from the bottom section was connected directly to a cyclone provided with a catch-pot in which the solid material was collected. A spray nozzle was located at the top of the apparatus and this was a $\frac{1}{4}$ JAU Automatic Air Atomizing Nozzle obtained from Spraying Systems Co. of the USA and having a 0.72 mm diameter nozzle.

Spraying was effected under nitrogen by passing a stream of nitrogen, preheated to a temperature of 140° C., into the spray-drying apparatus at a rate of 190 dm$^3$/minute. Nitrogen at a pressure of about 0.6 kg/cm$^2$ gauge was introduced into the spray nozzle. The homogenised mixture was fed from the 5 dm$^3$ flask to the spray nozzle by the application of an excess nitrogen pressure of 0.14 kg/cm$^2$ to this flask.

The solid was collected and placed in a 2 dm$^3$ flask together with 1.5 dm$^3$ of an aliphatic hydrocarbon diluent consisting essentially of dodecane isomers and having a boiling point in the range 170° C. to 185° C. (hereafter referred to simply as the "aliphatic hydrocarbon").

(E) Treatment of talc with thionyl chloride 500 grammes of talc (Extra Steamic Talc OOS, available from Talc de Luzenac, 50% by weight having a particle size of two microns or less) were placed in a 5 dm$^3$ flask fitted with a heating jacket and a stirrer. A solution of 2.5 dm$^3$ of toluene containing 10 cm$^3$ of thionyl chloride was added to the flask containing the talc. The mixture was stirred and heated up to 60° C. Stirring at 60° C. was continued for three hours and then heating and stirring were stopped. The mixture was allowed to cool and the solid to settle, but only slight settling occurred. The supernatant liquid was removed from the settled solid.

(F) Treatment of talc with tri(iso-butyl) aluminium 60 grammes of talc (as used in stage E) were placed in a 5 dm$^3$ glass flask fitted with a stirrer and containing 2 dm$^3$ of the aliphatic hydrocarbon which had been degassed. The mixture was stirred, without heating, and 22 cm$^3$ of a 1.5 M solution of tri(iso-butyl) aluminium in the aliphatic hydrocarbon were added and the mixture was stirred for a further 30 minutes.

(G) Washing with toluene

Washing was effected in a similar manner to stage (B) but on a larger scale. 30 kilogrammes of a milled titanium trichloride material were transferred to a jacketted steel reaction vessel of 200 dm$^3$ working capacity. The titanium trichloride had been milled with n-butyl benzoate in the manner as generally described in stage (A), but on a larger scale. 140 kg of toluene were added and the mixture was stirred and heated until a temperature of 50° C. was attained. The heating was then stopped but stirring was continued for an hour and then stopped and the solid allowed to settle overnight.

The supernatant liquid was siphoned off, 120 kg of fresh toluene added, the mixture was stirred, without heating, for 30 minutes and allowed to settle for two hours. The supernatant liquid was siphoned off to give a residual volume of 50 dm$^3$. The concentrated residual mixture was transferred to a 200 dm$^3$ mobile steel container provided with a stirrer. The reaction vessel was washed with 15 kg of toluene which was then added to the mixture in the 200 dm³ mobile steel container. To this mixture was added sufficient of the 10% weight/volume solution of polystyrene in toluene (as used in stage (B)), to give 2% of polystyrene relative to the solid.

(H) Dispersion of milled titanium trichloride n-butyl benzoate

A circulating loop was connected to the 200 dm³ mobile steel container and its contents as described in stage (G). The circulating loop included a 275 L Silverson high shear mixer available from Silverson Machines Limited, of Chesham, Buckinghamshire, England. The solid component of the suspension contained in the mobile steel container was dispersed by being repeatedly circulated through the circulating loop for a period of one hour. The dispersion produced was transferred into a nitrogen purged, stainless steel drum having a capacity of 180 dm³.

(J) Spray drying dispersed titanium trichloride-n-butyl benzoate

The dispersion in the stainless steel drum, which had been obtained as described in stage (H), was spray-dried using spray-drying apparatus essentially as described with reference to FIG. 2. The spray-drying vessel had a diameter of 2.2 m, a cylindrical height of 1.95 m and a 60° cone.

The circulating gas was nitrogen which was preheated to about 140° C. before entering the spray-drying vessel. The rate of supply of nitrogen was about 650 kg per hour.

The suspension was not pre-heated and hence was at ambient temperature on being fed to the spray-drying vessel.

The rate of rotation of the atomizer disc was 18000 rpm and the time during which the suspension was fed to the spray-drying vessel was 50 minutes.

EXAMPLE 1

Spray-drying titanium trichloride/talc mixture

The suspension of talc in toluene/thionyl chloride, obtained as described in pre-treatment stage (E), was added to a 5 dm³ flask having a stirrer and containing a 840 cm³ sample of the dispersion of titanium trichloride obtained as described in pre-treatment stage (C).

The mixture was stirred for 15 minutes and then stirring was stopped and the solid was allowed to settle for two hours. One dm³ of toluene was removed using a siphon to give a mixture containing about 30% by weight of solid. A further quantity of the polystyrene solution used in pre-treatment stage (B) was added to give 2% by weight of polystyrene relative to the total weight of solid (titanium trichloride+talc).

The mixture was stirred for 5 minutes and was then dispersed using an Ultra Turrax T45 high shear homogeniser (as used in pre-treatment stage (C)).

The homogeniser was fitted into a 300 cm³ glass flask having a heating/cooling jacket, a bottom inlet port and a top outlet port. A circulating loop which included the vessel containing the titanium trichloride/talc mixture and the flask containing the homogeniser was used. Dispersion was effected by operating the homogeniser at maximum power and circulating the mixture through the flask containing the homogeniser for 30 minutes.

The homogenised mixture was spray-dried using the procedure described in pre-treatment stage (D).

The solid was collected and placed in a 2 dm³ flask together with 1.5 dm³ of the aliphatic hydrocarbon.

EXAMPLES 2 TO 4

Into a 100 dm³ stainless steel autoclave having a heating jacket and fitted with a stirrer were placed 28 kg of polypropylene powder having a flexural modulus of 1.45 GN/m² and 4.0% by weight of which was soluble in hot heptane as determined from the weight loss after Soxhlet extraction using boiling heptane for 15 hours. The pressure was reduced to 75 millibars and then nitrogen was added to a pressure of one bar, this procedure being carried out a total of three times. The stirrer was rotated at 60 rpm and stirring was continued throughout the following procedures. The autoclave was heated up to 80° C., whilst passing nitrogen through the autoclave. The pressure was reduced to 75 millibars and liquid propylene was added to the autoclave and vaporised to raise the pressure to 28 kg/cm² gauge. Hydrogen was added separately in the proportion of 1.5% by weight relative to the propylene.

A solution of diethyl aluminium chloride in the aliphatic hydrocarbon and a 40% by weight suspension in the aliphatic hydrocarbon of a titanium trichloride material were introduced into the autoclave in the molar proportions of 8:1 until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate to maintain the pressure at 28 kg/cm² gauge and polypropylene, saturated with propylene, was intermittently withdrawn from the autoclave at a rate of about 8 kg of polymer per hour. The temperature and pressure were maintained at 75° C. and 28 kg/cm² gauge respectively. The diethyl aluminium chloride solution and the suspension were continuously introduced into the autoclave in the molar proportions of diethyl aluminium chloride to titanium trichloride of 8 to 1 and at a rate to maintain the rate of polymer production at 8 kg/hr of polymer.

Initially, polymerisation was effected using a titanium trichloride product obtained as described in pretreatment stage (D) (this product will be identified hereafter by the reference D). Using this material the rate of polymer production was 15 kg/hr. Subsequently the product of Example 1 was used under the conditions set out.

Some properties of the polymer products removed at various times during the polymerisations are set out in Table One.

TABLE ONE

| Ex or Comp Ex | TiCl₃ type (a) | Time (hrs) (b) | MFI (c) | FM (d) | Ti (e) | HHS (f) |
|---|---|---|---|---|---|---|
| 2 | 1 | 17 | 3.0 | 1.73 | 94 | ND |
| 3 | 1 | 19 | 3.2 | 1.71 | 104 | 2.5 |
| 4 | 1 | 21 | 3.6 | 1.74 | 99 | 2.5 |
| I | D | 16 | 3.7 | 1.38 | 76 | ND |
| II | D | 18 | 3.8 | 1.44 | 68 | 5.4 |
| III | D | 20 | 3.6 | 1.41 | 71 | 6.3 |

Notes to Table One
(a) 1 is the product of Example 1.
D is the product of pretreatment stage D).
(b) The time is the time, in hours, from the commencement of using the specified catalyst system.
(c) MFI is melt flow index measured by ASTM Test Method D 1238/70, using a temperature of 230° C. and a 2.16 kg weight.
(d) FM is the flexural modulus expressed in GN/m².
The flexural modulus was measured using a

TABLE ONE-continued

| Ex or Comp Ex | TiCl₃ type (a) | Time (hrs) (b) | MFI (c) | FM (d) | Ti (e) | HHS (f) |
|---|---|---|---|---|---|---| cantilever beam apparatus as described in Polymer Age, March 1970, pages 57 and 58. The deformation of a test strip at 1% skin strain after 60 seconds at 23° C. and 50% relative humidity was measured. The test strip, which had dimensions of approximately 150 × 19 × 1.6 mm, was prepared in the following manner. 23 g of the polymer were mixed with 0.1% by weight of an antioxidant ('Topanol' CA), and the mixture was added to a Brabender Plasticiser, at 190° C., 30 rpm and under a load of 10 kg to covert it to a crepe. The crepe was placed within a template, between aluminium foil and pressed by means of a heated press at a temperature of 250° C. The pressing was pre-heated for a period of 6 minutes, under just enough pressure to make the polymer flow across the template, that is an applied force of about 1 tonne. After the pre-heat period, the applied force was raised to 15 tonnes in 5 tonne increments, degassing (that is releasing pressure) every 5 tonnes. After 2 minutes at 15 tonnes, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C. and after 2 hours at this temperature the heat was switched off and the oven cooled to ambient temperature at 15° C. per hour.

(e) The titanium (Ti) residues from the catalyst are given in parts per million by weight relative to the total polymer product (polymer + catalyst residues) and were measured by X-ray fluorescence on compression moulded discs.

(f) HHS is the percentage of hot heptane soluble polymer as determined from the weight loss of a sample (about 5 g) of the polymer which has been subjected to extraction for 15 hours with boiling heptane using a jacketted Soxhlet extractor.

EXAMPLE 5

In this example, a mixture of titanium trichloride and talc was formed in a polymerisation reactor in the presence of propylene and diethyl aluminium chloride whereby polymerisation of propylene occurred on the addition of the titanium trichloride to the polymerisation reactor containing the talc.

The polymerisation was carried out in a 20 gallon (91 dm³) stainless steel autoclave having a stirrer and heating/cooling means.

62 dm³ of the aliphatic hydrocarbon (as used in pre-treatment stage (D)) were charged into the vessel, and degassed at 60° C. for 30 minutes at a pressure of 0.07 kg/cm² absolute. Propylene containing 0.15% by volume of hydrogen, was then admitted to the vessel in an amount to give a pressure of 1 psi (0.07 kg/cm²) gauge. The diluent was stirred and stirring was continued throughout the following procedures.

The suspension of talc in the aliphatic hydrocarbon, which was the product of pre-treatment stage (F), was added to the polymerisation reactor. 0.536 mole of diethyl aluminium chloride, as a 25% by weight solution in the aliphatic hydrocarbon was then added to the autoclave followed by 1.5 dm³ of the aliphatic hydrocarbon. 0.134 mole of spray-dried titanium trichloride (prepared as described in pre-treatment stage (J)) was added as a suspension of titanium trichloride in the aliphatic hydrocarbon. 1.5 dm³ of the aliphatic hydrocarbon were then added.

The autoclave was maintained at 60° C. while propylene was passed into the autoclave at a constant rate of 22 pounds per hour (about 10 kilograms per hour). The propylene charge contained 0.22% by volume of hydrogen. A total of 24 kilograms of propylene were passed into the autoclave, after which the propylene feed was terminated and the autoclave pressure was allowed to run down to 5 psi (0.35 kg/cm²) gauge. The residual propylene was then vented off and the polymer suspension passed into a glass-lined vessel. The autoclave was washed with 20 dm³ of the aliphatic hydrocarbon which was also added to the glass-lined vessel. The contents of the glass-lined vessel were mixed with isopropanol in an amount of 3% by volume relative to the aliphatic hydrocarbon. The mixture was stirred for 0.5 hour at 70° C., a mixture of isopropanol and water (containing 10% by volume of water) was added in an amount of 0.6% by volume relative to the diluent and stirring at 70° C. was continued for a further 1.5 hours.

The polymer suspension was then run into a further vessel containing 40 dm³ of demineralised water at ambient temperature, and the mixture was stirred for 30 minutes. The aqueous phase was then decanted off and a further 40 dm³ of demineralised water at ambient temperature were added and the process was repeated. The aliphatic hydrocarbon was then filtered off and the polymer was dried at 100° C. in a fluidised bed using nitrogen as fluidising gas.

For the purposes of comparison, a further polymerisation was effected under essentially the same conditions with the major difference that talc was not added to the polymerisation reactor. More specifically, the initial charge to the reactor was 64 dm³ of the aliphatic hydrocarbon and after introducing propylene at a pressure of 1 psi (0.07 kg/cm²) gauge, the solution of diethyl aluminium chloride was added and the procedure was then as described previously.

The results obtained are set out in Table Two.

TABLE TWO

| Ex or Comp Ex | Talc added | % diluent soluble polymer (h) Before | % diluent soluble polymer (h) After | MFI (i) | FM (d) (GN/m²) | Activity (j) |
|---|---|---|---|---|---|---|
| 5 | Yes | 0.8 | 1.1 | 14.5 | 1.8 | 413 |
| IV | No | 1.1 | 1.6 | 22.9 | 1.7 | 370 |

Notes to Table Two
(d) Is as defined in Notes to Table One.
(h) The diluent soluble polymer is determined by evaporation to dryness of a sample of the polymerisation diluent and is expressed as a % by weight based on the weight of propylene added. "Before" indicates that the sample of the polymerisation diluent was taken at the end of the polymerisation, before adding the isopropanol. "After" indicates that the sample of the polymerisation diluent was taken at the end of the treatment with the isopropanol/water mixture.
(i) MFI is determined as described in Note (c) to Table One using a temperature of 190° C. and a 10 kg weight.
(j) Activity is the number of moles of propylene polymerised per mole of titanium trichloride in the catalyst during the final hour of the polymerisation for each kg/cm² pressure of propylene. The propylene pressure is determined by correcting the total pressure for the presence of inert materials such as nitrogen and propane which are determined by titrating the gas space at the end of the polymerisation with bromine

I claim:

1. A solid material which is a mixture of (a) a solid composition containing at least one transition metal of Groups IVA, VA or VIA of the Periodic Table and (b) finely divided talc and/or a salt of aluminium or of a metal of Group IA or IIA of the Periodic Table and a carboxylic acid containing an aromatic group, wherein components (a) and (b) are present in the solid material in the relative proportions by weight of from 20:1 to 1:10.

2. The material of claim 1 wherein component (a) is titanium trichloride which also includes aluminium halides or is titanium tetrachloride supported on magnesium chloride.

3. The material of claim 1 wherein components (a) and (b) are present in the relative proportions by weight of from 2:1 to 1:4.

4. The material of claim 1 which is in the form of discrete particles, at least 90% by weight of the discrete particles being an agglomeration of sub-particles of both component (a) and component (b).

5. The material of claim 4 wherein at least 90% by weight of the discrete particles have a particle size in the range from 5 up to 100 microns.

6. A process wherein (a) a solid composition containing a transition metal of Groups IVA, VA or VIA of the Periodic Table is mixed with (b) finely divided talc and/or a salt of aluminium or of a metal of Group IA or IIA of the Periodic Table and a carboxylic acid containing an aromatic group, and (a) and (b) are mixed in the relative proportions by weight of from 20:1 to 1:10.

7. The process of claim 6 wherein components (a) and (b) are mixed together in the presence of an organic metallic compound, which is of the type useable as a component of an olefin polymerisation catalyst system.

8. The process of claim 6 wherein component (b) is talc which contains absorbed water and the talc is treated with a reagent which reacts with at least the major proportion of the absorbed water before mixing the talc with component (a).

9. The process of claim 6 wherein a solid compound of a transition metal is ground with a Lewis Base compound and before, after or during the grinding with the Lewis Base compound is also ground with component (b).

10. The process of claim 6 wherein either (i) a suspension containing both component (a) and component (b) is spray-dried or (ii) a suspension containihg a support for a compound of a transition metal and component (b) is spray-dried and thereafter the spray-dried material is contacted with a compound of a transition metal.

11. The process of claim 10 wherein a suspension containing titanium trichloride and talc is spray-dried.

12. The process of claim 10 wherein the suspension is subjectd to a pulverising step and the pulverised mixture is spray-dried.

13. A polymerisation catalyst which is the product obtained by mixing together
(1) a transition metal composition which is the solid material of claim 1; and
(2) an organic compound of aluminium or of a metal of Group IIA of the Periodic Table or a complex of an organic compound of a metal of Group IA or Group IIA of the Periodic Table together with an organic compound of aluminium.

* * * * *